A. N. MYERS.
Churning Apparatus.

No. 204,241. Patented May 28, 1878.

WITNESSES:
C. Neveux
C. Sedgwick

INVENTOR:
A. N. Myers
BY Munn & Co
ATTORNEYS.

UNITED STATES PATENT OFFICE.

ALFRED N. MYERS, OF AUGUSTA, KENTUCKY.

IMPROVEMENT IN CHURNING APPARATUS.

Specification forming part of Letters Patent No. 204,241, dated May 28, 1878; application filed March 2, 1878.

*To all whom it may concern:*

Figure 1:
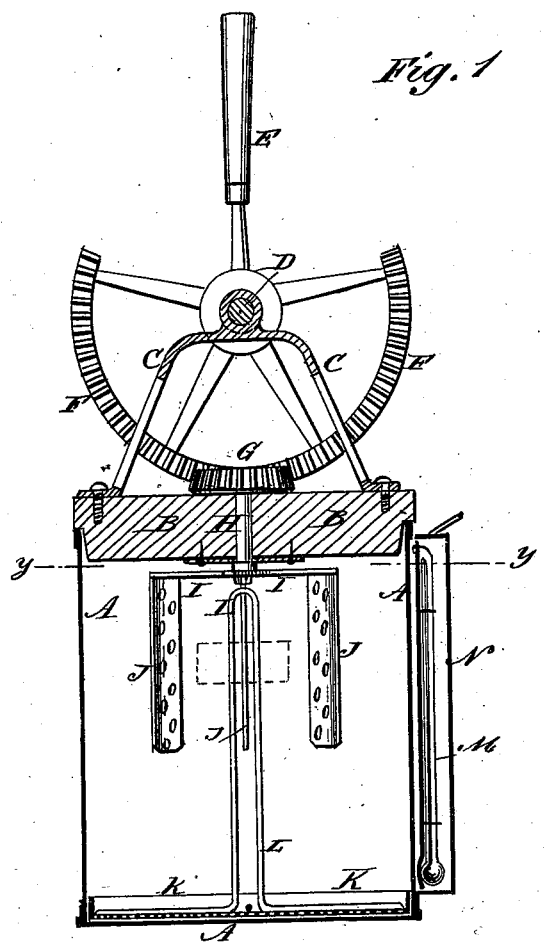
Figure 2:
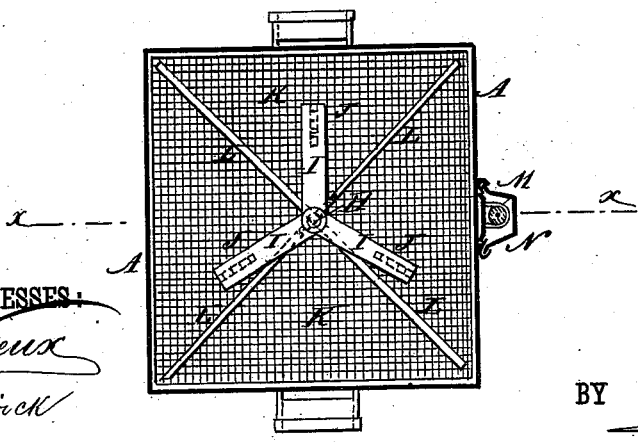

Be it known that I, ALFRED N. MYERS, of Augusta, in the county of Bracken and State of Kentucky, have invented a new and useful Improvement in Churning Apparatus, of which the following is a specification:

Figure 1 is a vertical section of my improved churning apparatus, taken through the line $x$ $x$, Fig. 2. Fig. 2 is a horizontal section of the same, taken through the line $y$ $y$, Fig. 1.

Similar letters of reference indicate corresponding parts.

The invention will first be described in connection with the drawing, and then pointed out in the claim.

A is the churn-body, which is made rectangular in form, and of any desired size. The churn-body A is provided with a closely-fitting cover, B, to the upper side of which is attached a bracket, C.

In bearings in the bracket C revolves a shaft, D, to one end of which is attached a lever, E, by means of which the churn is operated.

To the shaft D is attached the segment F of a bevel-gear wheel, the teeth of which mesh into the teeth of a small bevel-gear wheel, G, attached to the upper end of a short vertical shaft, H. The shaft H passes down through a hole in the center of the cover B, and to its lower end, at the lower side of the said cover B, is attached a three-armed plate, I, to the ends of the arms of which are attached the upper ends of three downwardly-projecting bars or paddles, J. The paddles or arms J have numerous holes formed through them for the passage of the milk.

With this construction, by oscillating the lever E the arms J will be moved rapidly through the milk, first in one direction and then in the other, throwing the milk into violent agitation, and bringing the butter in a very short time.

K is a strainer, made of finely-perforated sheet metal, which has an upwardly-projecting flange formed around its edge, and which is made of such a size as to fit into the churn-body A and rest upon its bottom.

The perforated plate K is stiffened and strengthened by wires L passing diagonally across it, and the middle part of one of which is bent into U or loop form, the said loop being made of such a height as to rise above the milk in the center of the churn-body, so as to be out of the way of the arms J as they revolve, and serve as a handle for raising the plate K out of the milk to remove the butter.

To one side of the churn-body A is attached a thermometer, M, so that the warmth of the milk can be easily and accurately known at any time. The thermometer is covered and protected by a cover, N, which slides in groove-cleats attached to the churn-body A.

Having thus described my invention, I claim as new and desire to secure by Letters Patent—

The churn-strainer K, provided with wires L passing diagonally across it and forming a U-shaped vertical loop, as and for the purpose specified.

ALFRED N. MYERS.

Witnesses:
MARTIN P. MARSHALL,
A. E. RANKINS.